United States Patent
Schlaupitz (10) Patent No.: US 11,811,097 B2
(45) Date of Patent: Nov. 7, 2023

(54) BATTERY TAB DESIGN, METHOD OF MANUFACTURE THEREOF AND BATTERIES COMPRISING THE SAME

(71) Applicant: GM Global Technology Operations LLC, Detroit, MI (US)

(72) Inventor: Christopher Schlaupitz, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 323 days.

(21) Appl. No.: 17/087,929

(22) Filed: Nov. 3, 2020

(65) Prior Publication Data

US 2022/0140451 A1 May 5, 2022

(51) Int. Cl.
*H01M 50/533* (2021.01)
*H01M 10/0525* (2010.01)
*H01M 50/536* (2021.01)
*H01M 50/193* (2021.01)

(52) U.S. Cl.
CPC ..... *H01M 50/533* (2021.01); *H01M 10/0525* (2013.01); *H01M 50/536* (2021.01)

(58) Field of Classification Search
CPC .................................................. H01M 50/533
See application file for complete search history.

(56) References Cited

U.S. PATENT DOCUMENTS

| | | | |
|---|---|---|---|
| 2008/0187828 A1* | 8/2008 | Oh | H01M 10/052 |
| | | | 429/181 |
| 2008/0268344 A1* | 10/2008 | Kim | H01M 50/55 |
| | | | 429/246 |
| 2019/0207197 A1* | 7/2019 | Lee | H01M 50/533 |

FOREIGN PATENT DOCUMENTS

JP 2003242961 * 8/2003

* cited by examiner

*Primary Examiner* — Lisa S Park
(74) *Attorney, Agent, or Firm* — CANTOR COLBURN LLP (57) ABSTRACT

A tab for use in a battery comprises a metal piece that comprises a cross-sectional area geometry that is a rhombus, a parallelogram or a trapezoid when viewed in a lateral direction. The metal piece further comprises a cross-sectional area geometry having a variable thickness when viewed in a longitudinal direction that is perpendicular to the lateral direction. When viewed in the longitudinal direction, a tab thickness $t_1$ at a point where the tab is in contact with an electrode is less than the tab thickness $t_2$ at a point where the tab contacts a pouch.

16 Claims, 8 Drawing Sheets

BATTERY TAB DESIGN, METHOD OF MANUFACTURE THEREOF AND BATTERIES COMPRISING THE SAME

BACKGROUND

This disclosure relates to battery tab design, methods of manufacture thereof and batteries that contain the tabs. Battery tabs play a valuable role in lithium-ion cell battery technologies. Typical large format lithium-ion cells use metals such as copper for the anode foil (current collector) and aluminum for the cathode foil. A 'foil-to-tab' weld is needed to gather all the current collector plates (foils) inside the cell and join them to a tab. The tab contacts an outside load to transfer the current to the load.

Tab thicknesses are currently limited when used in batteries that have pouch designs primarily because of the inability to seal tabs having thicknesses of greater than 0.4 millimeters and because of the inability to weld such thick tabs to the electrodes. Thinner tabs experience increased temperatures because of resistive heating and this proves to be a major limitation for direct current fast charging (DCFC) and high power driving.

Figure 1A:
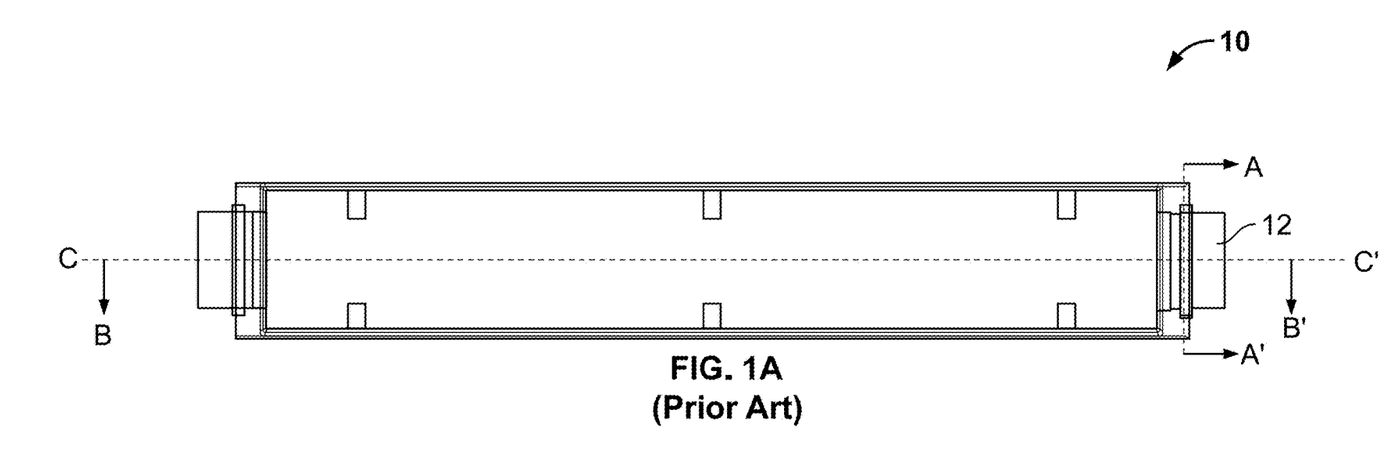
FIG. 1A is a depiction of a top view of a battery that comprises a pouch through which a tab protrudes.
Figure 1B:
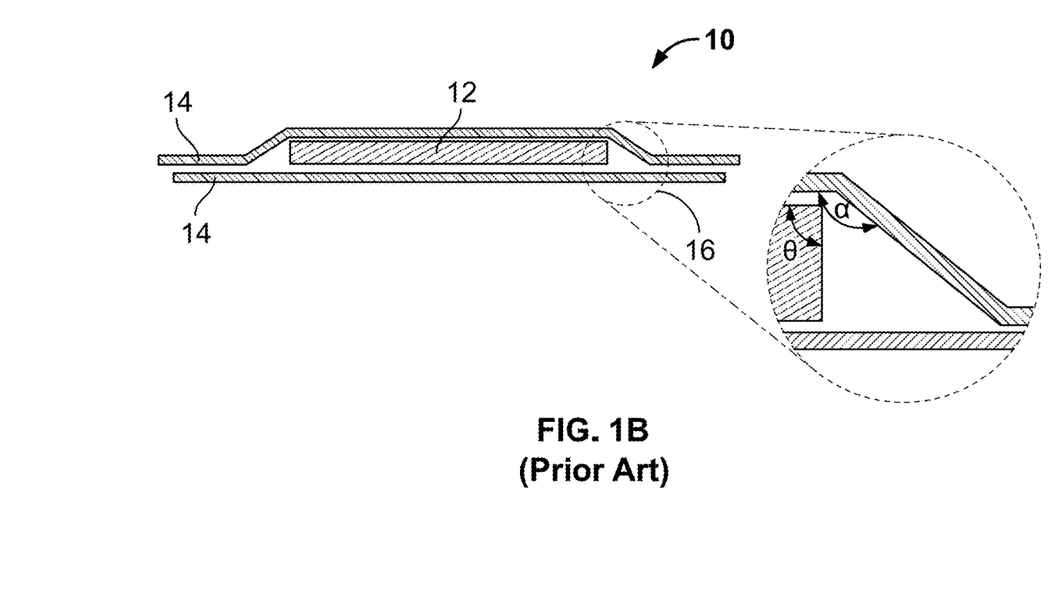
FIG. 1B is a depiction of a cross-section of the battery taken at section A-A' of FIG. 1A.
Figure 1C:
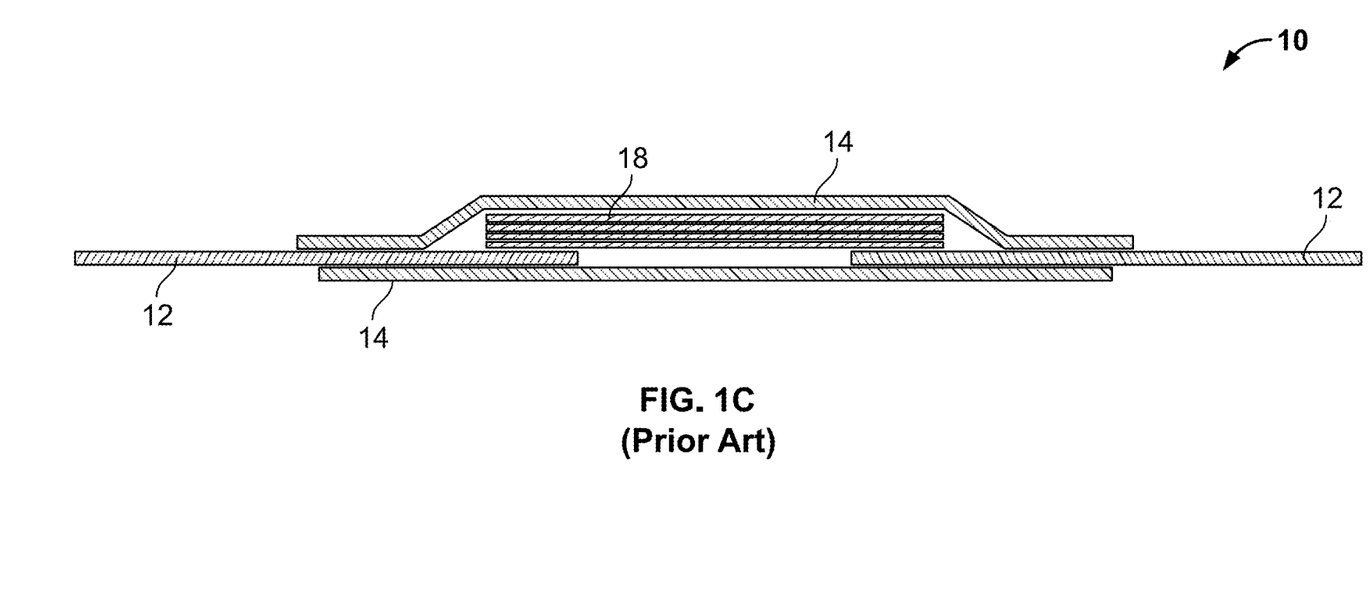
FIG. 1C is a depiction of a cross-section of the battery taken at section B-B' of FIG. 1A.

FIG. 1A, FIG. 1B and FIG. 1C are depictions of a currently commercially available pouch cell battery 10 that has tabs 12 for transmitting current from the current collector to a load (not shown). Pouch cell batteries (hereinafter pouch cells) offer a simple, flexible and lightweight solution to battery design. Pouch cells can deliver high load currents but perform best under light loading conditions and with moderate charging. The pouch cell makes most efficient use of space and achieves a 90 to 95 percent packaging efficiency, the highest among battery packs.

FIG. 1B is a depiction of a cross-section of the pouch cell battery 10 taken at Section A-A', while FIG. 1C is a depiction of a cross-section of the pouch cell battery 10 taken at Section B-B'. With reference now to the FIGS. 1A, 1B and 1C, the pouch cell battery 10 comprises a pouch 14 that contains a plurality of electrodes 18 (See FIG. 1C) that are in electrical communication with at least one tab 12. The pouch 14 has a geometrical shape that does not comply with the shape of the tab 12 and/or the plurality of electrodes 18. This may be seen in the FIG. 1B, in the encircled region 16, where a square-ended tab 12 (having an included angle (θ) of 90 degrees) is situated adjacent to a beveled edge of the pouch 14 having an interior angle (α) that may vary from 10 to 80 degrees depending upon the material of construction of the pouch. This inability of the pouch to conform to the shape of the tab, produces a gap or opening through which electrolyte contained in the pouch may leak. This problem is sometimes overcome by limiting tab thickness to less than 0.4 millimeters. Limiting tab thicknesses however, reduces battery output. It is therefore desirable to arrive at new tab designs which overcome some of the foregoing problems.

SUMMARY

In an embodiment, a tab for use in a battery comprises a metal piece that comprises a cross-sectional area geometry that is a rhombus, a parallelogram or a trapezoid when viewed in a lateral direction. The metal piece further comprises a cross-sectional area geometry having a variable thickness when viewed in a longitudinal direction that is perpendicular to the lateral direction. When viewed in the longitudinal direction, a tab thickness $t_1$ at a point where the tab is in contact with an electrode is less than the tab thickness $t_2$ at a point where the tab contacts a pouch.

In another embodiment, the cross-sectional geometry is a trapezoid when viewed in the lateral direction.

In yet another embodiment, an outer surface of the metal piece is parallel to an inner surface of the pouch when viewed in the lateral direction.

In yet another embodiment, the outer surface of the metal piece contacts the inner surface of the pouch when viewed in the lateral direction and wherein this contact prevents a leakage of electrolyte from the battery.

In yet another embodiment, the outer surface of the metal piece continuously contacts the inner surface of the pouch when viewed in the lateral direction.

In yet another embodiment, the metal piece has a reduced thickness $t_1$ which permits the metal piece to overlap with the electrode inside the pouch when viewed in the longitudinal direction; and wherein the electrode contacts the metal piece via a weld.

In yet another embodiment, the metal piece has a thickness $t_2$ that is greater than thickness $t_1$ at a point where the pouch contacts the metal piece when viewed in the longitudinal direction.

In yet another embodiment, the metal piece further contains an indentation of thickness $t_3$ that lies outside the pouch when viewed in the longitudinal direction; and wherein the thickness $t_3$ is less than the thickness $t_2$.

In yet another embodiment, the indentation facilitates bending of the metal piece to accommodate a use of a battery in a constricted space.

In yet another embodiment, the metal piece further contains a thicker section of thickness $t_4$ that is greater than the thickness $t_3$ when viewed in the longitudinal direction; and wherein the thicker section facilitates welding of the tab to a load.

In yet another embodiment, the thicker section $t_4$ is located further from the pouch than the indentation of thickness $t_3$.

In yet another embodiment, the pouch comprises an inner sealant layer that is in continuous contact with the tab In yet another embodiment, the battery comprises a liquid electrolyte.

In yet another embodiment, the at least one surface of the rhombus, the parallelogram or the trapezoid is not a flat surface.

In an embodiment, a method of manufacturing a tab comprises roll forming and/or stamping a sheet of metal; casting a molten metal into a die; or sintering a metal powder under pressure to form a tab for a battery. The tab comprises a cross-sectional area geometry that is a rhombus, a parallelogram or a trapezoid when viewed in a lateral direction. The tab also comprises a cross-sectional area geometry having a variable thickness when viewed in a longitudinal direction. The longitudinal direction is perpendicular to the lateral direction. When viewed in the longitudinal direction, the tab thickness $t_1$ at a point where the tab is in contact with an electrode is less than a tab thickness $t_2$ at a point where the tab contacts a pouch of the battery.

In an embodiment, the method further comprises performing a finishing operation on the tab; wherein the finishing operation comprises machining and polishing the tab.

In yet another embodiment, the method further comprises sealing an inner surface of the pouch to an outer surface of the tab.

In yet another embodiment, the method further comprises welding the tab to a plurality of electrodes located in the pouch.

In yet another embodiment, the tab contains an indentation of thickness $t_3$ that lies outside the pouch; and wherein the thickness $t_3$ is less than the thickness $t_2$.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Disclosed herein is a battery contained in a pouch where the battery tabs are provided with a cross-sectional geometry that conforms to a shape acquired by the pouch in those regions of the battery where electrolyte leakage may occur. Disclosed herein too is a battery whose tabs have variable thickness in a longitudinal direction (see axis X-X' in the FIG. 2). The tabs comprise a metal piece that has a smaller height and a smaller cross-sectional area in those areas where welding of the electrodes to the tab is desired and has a larger height and a larger cross-sectional area in those regions where electrolyte leakage may occur. In addition, the tabs are designed to have predetermined flex points (indentation points) where the tab can be bent in a controlled fashion with significantly reduced force. The predetermined flex point is one where the cross-sectional area is smaller than the surrounding cross-sectional area, thus making it easier to bend the tab at the flex point.

Figure 2:
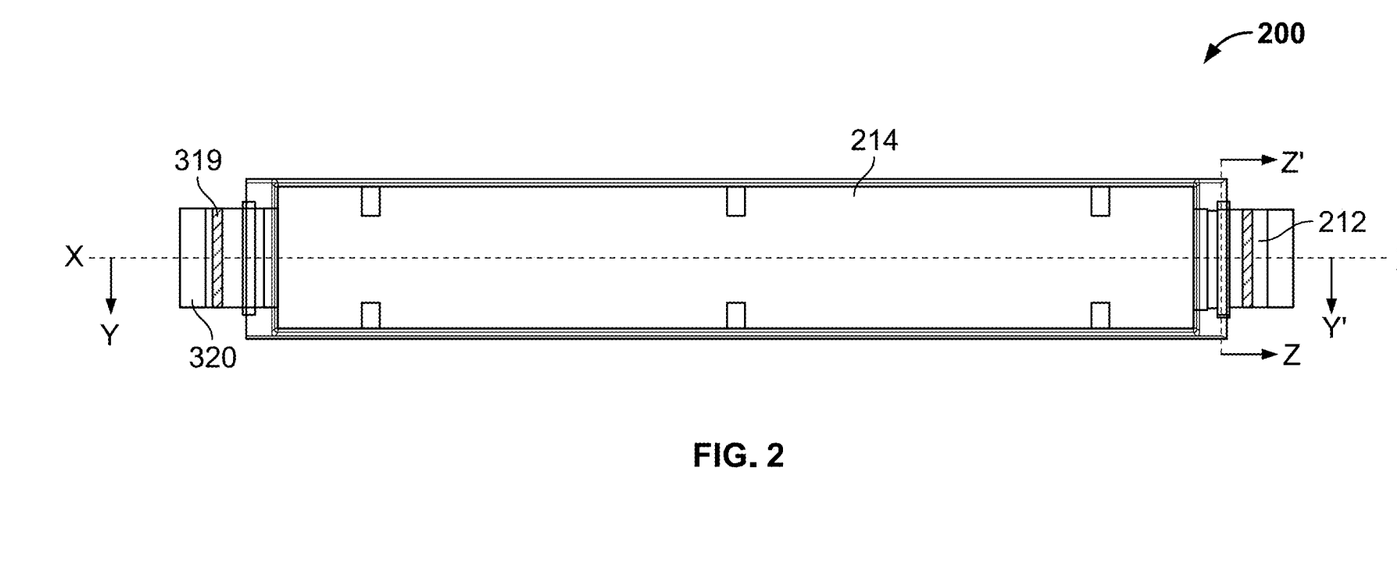
FIG. 2 is a schematic depiction of a top view of the disclosed tab.
Figure 3:
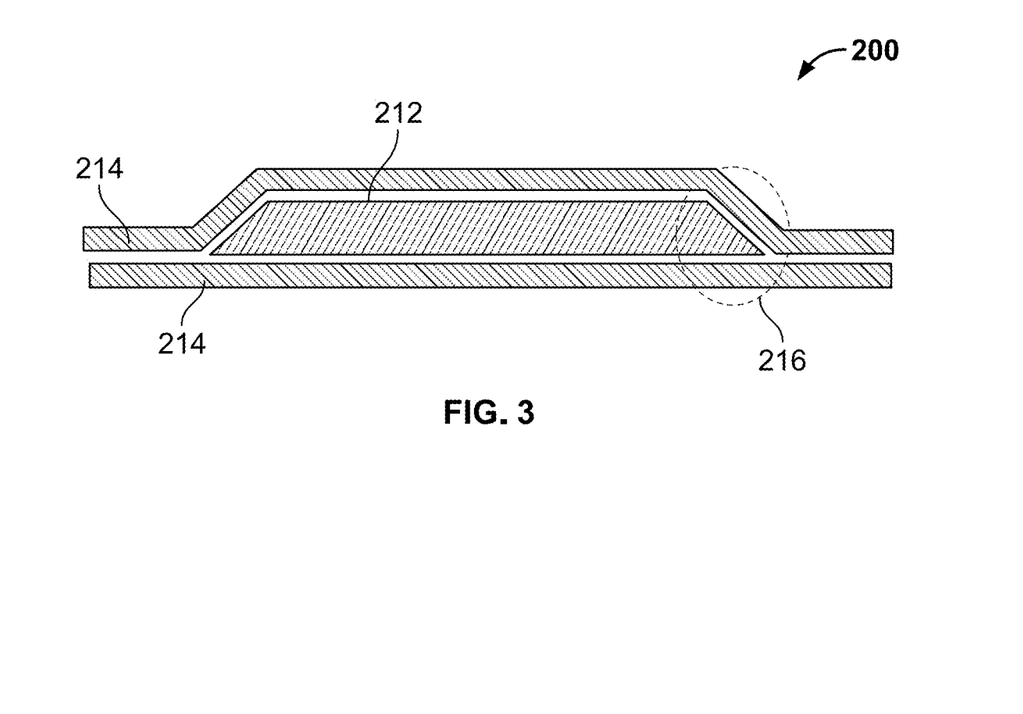
FIG. 3 is a schematic depiction of the disclosed tab as viewed at section Z-Z' of FIG. 2.

FIG. 2 depicts one exemplary embodiment of a top view of a battery 200 that contains a pouch 214 and a tab 212. The pouch 214 contains electrodes (an anode and a cathode) (not shown) and an electrolyte (not shown). The electrodes and the electrolyte will be discussed in detail later. The battery 200 has a longitudinal axis X-X' about which the tabs 212 are preferably symmetrically located. FIG. 3 is an exemplary depiction taken at cross-section Z-Z' of the FIG. 2. The cross-section Z-Z' is perpendicular to the longitudinal axis X-X'. FIGS. 4A, 4B, 4C and 4D are depictions of the battery 200 taken at section Y-Y' of the FIG. 2, which is parallel to the longitudinal axis X-X'.

Figure 4A:
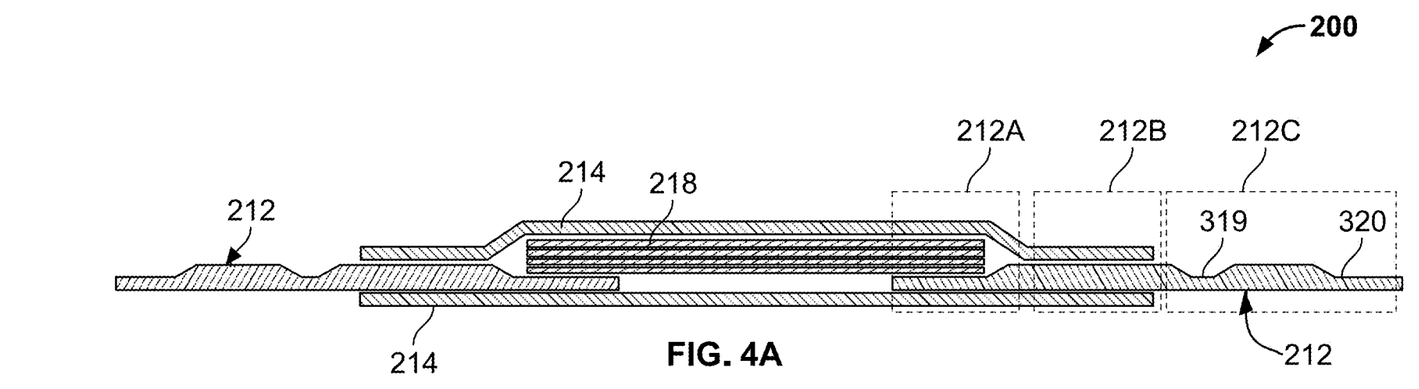
FIG. 4A is a schematic depiction of the disclosed tab as viewed at section Y-Y' of FIG. 2.
Figure 4B:
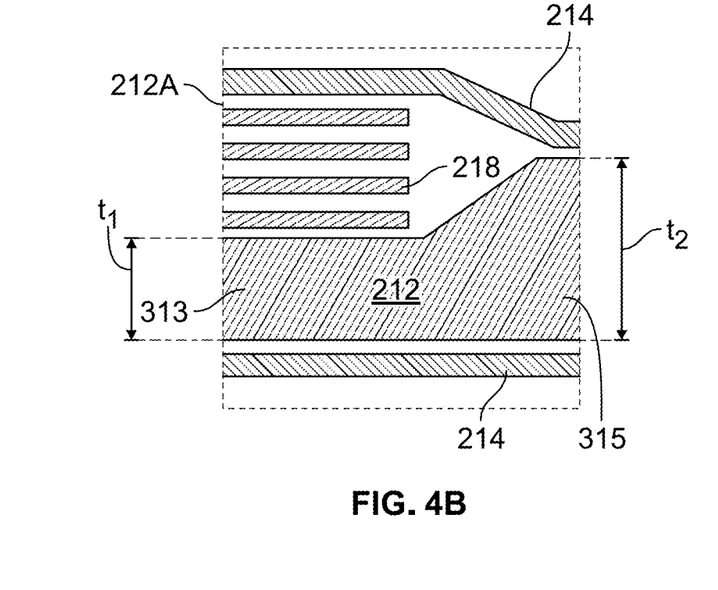
FIG. 4B is a schematic depiction of a portion of the disclosed tab as viewed at section Y-Y' of FIG. 2.

With reference to the FIGS. 2, 4A, and 4B the pouch 214 may contain a plurality of electrodes 218 (anodes and cathodes) that are welded together and that are welded to the tab 212. The anode comprises graphite or graphite coated copper, while the cathode comprises nickel cobalt manganese aluminium (NCMA) or nickel cobalt manganese aluminium (NCMA) coated aluminum. The electrodes may be in contact with current collectors. A suitable material for the anode current collector is copper, while a suitable material for the cathode current collector is aluminum.

FIG. 3 depicts an exemplary cross-sectional view of the battery 200 taken at section Z-Z' of the FIG. 2. Section Z-Z' is taken where the pouch 214 contacts the tab 212 and is perpendicular to longitudinal axis X-X'. The view in the FIG. 3 shows that the cross-sectional geometry of the tab 212 as viewed perpendicular to longitudinal axis X-X' is similar to the cross-sectional geometry of the internal area of the pouch 214 except that it is smaller. In other words, the shape of the cross-sectional area of the tab 212 is the same as the shape of the internal cross-sectional area of the pouch 214 except that it is smaller. This is achieved by maintaining the outer surface of the tab parallel to the inner surface of the pouch as viewed along section Z-Z'. This is depicted in the circle 216. In an embodiment, the outer surface of the tab is maintained to be parallel to the inner surface of the pouch 214 as viewed along section Z-Z' of the battery 200.

In an embodiment, the cross-sectional area of the tab as viewed along section Z-Z' has a geometrical shape that is a trapezoid, a parallelogram or a rhombus. In an embodiment, at least one surface of the trapezoid, the rhombus and the parallelogram may be non-linear (e.g., curved instead of flat). In a preferred embodiment, the shape of the cross-sectional area of the tab as viewed along section Z-Z' is a trapezoid. In other words, the thickness of the tab when viewed in perpendicular to longitudinal axis X-X' is fairly constant, except for the ends of the tab where the thickness tapers.

In an embodiment, the outer surface of the tab 212 is parallel to the inner surface of the pouch 214 as the two surfaces are in continuous contact in those regions where these surfaces are adjacent to one another. In other words, there is no space between the outer surface of the tab 212 and the inner surface of the pouch 214 in those regions where these two surfaces are adjacent to one another. In another embodiment, the space between the outer surface of the tab 212 and the inner surface of the pouch 214 in those regions where these two surfaces are adjacent to each other is minimized to prevent leakage of the electrolyte.

This configuration is advantageous because it prevents leakage of the electrolyte from the interstitial gap between the tab 212 and the pouch 214. Leakage generally occurs when the outer surface of the tab is not parallel to the inner surface of the pouch such as in the FIG. 1B.

FIG. 4A depicts another embodiment of the tab 212 taken along section Y-Y' of the FIG. 2. Section Y-Y' is parallel to the longitudinal axis X-X'. It is to be noted that the view depicted in the FIG. 3 and the view taken in the FIG. 4A are in mutually perpendicular directions. FIG. 3 represents the view in a first direction, while FIG. 4A represents the view in a second direction perpendicular to the first direction.

FIG. 4A is a side view of the tab 212. The tab 212 when viewed in a direction parallel to the longitudinal axis X-X' (see FIG. 2) comprises a plurality of different thicknesses instead of the uniformly thick tab as seen in the FIG. 1C.

Figure 4C:
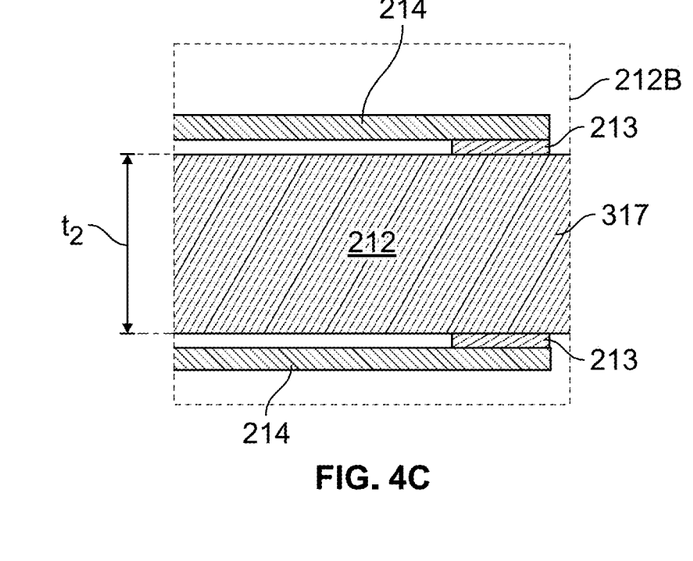
FIG. 4C is a schematic depiction of another portion of the disclosed tab as viewed at section Y-Y' of FIG. 2.
Figure 4D:
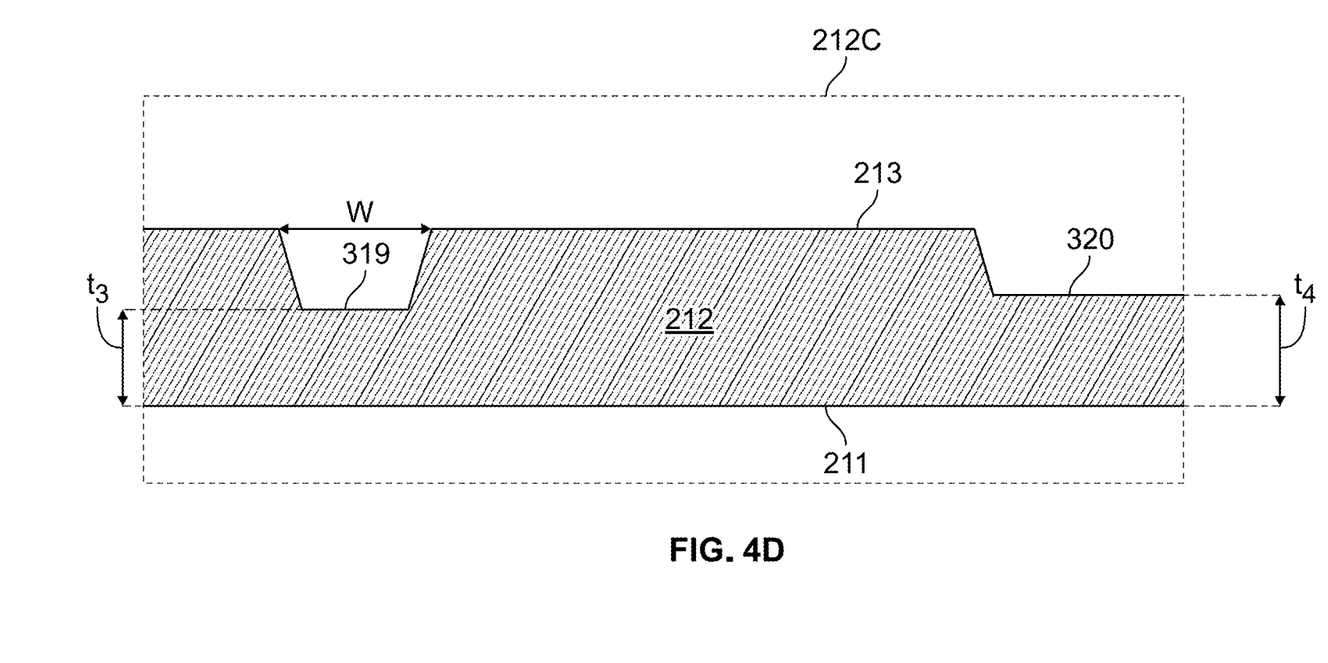
FIG. 4D is a schematic depiction of another portion of the disclosed tab as viewed at section Y-Y' of FIG. 2.

From the FIG. 4A, it may be seen that the tab thickness is variable depending upon its location relative to the point where the pouch 214 contacts the tab 212. In order to explain the thickness variations, the tab has been divided into three exemplary sections 212A, 212B and 212C all of which are parallel to the longitudinal axis X-X'. Section 212A depicts the portion of the tab 212 that lies within the pouch 214 (FIG. 4B). Section 212B depicts the portion of the tab 212 in the region where it contacts the pouch 214 either directly or via an adhesive layer (the sealing region) (FIG. 4C). Section 212C depicts the portion of the tab 212 that lies outside the pouch 214 (FIG. 4D).

FIG. 4B depicts section 212A of the tab that lies within the pouch 214 and encompasses the portion of the tab that is in contact with the electrode (or in contact with the plurality of electrodes 218). The tab 212 has a narrower thickness $t_1$ in the region 313 where the electrodes 218 can overlap with the tab 212 without increasing the thickness of the pouch 214. The tab thickness $t_1$ in the overlapping region can be selected so as to permit welding between the electrodes and the tab without any reduction in battery performance and without any increase in thickness of the pouch 214 when compared with a battery that does not have an overlap between the electrode (or the plurality of electrodes) and tab.

As can be seen the thickness of the tab increases from $t_1$ in the region of electrode overlap to $t_2$ in the region where the pouch 214 meets the tab 212. The thickness $t_2$ is selected to facilitate continuous contact between the pouch 214 and the tab 212. This continuous contact between the pouch 214 and the tab 212 prevents leakage of electrolyte from the battery 200. The leakage prevention is accomplished by establishing contact between the pouch 214 and the tab 212, which is discussed in detail herein. The increase in thickness of the tab from $t_1$ to $t_2$ facilitates the contact between the pouch 214 and the tab 212 with minimal stress on the pouch and maximum sealing contact between the pouch and the tab. The thickness $t_2$ may be 10% to 150%, preferably 25% to 100% greater than the thickness $t_1$.

FIG. 4C depicts section 212B and shows the portion of the tab 212 as it contacts the pouch 214 via an optional adhesive layer 213 to seal the battery 200. In an embodiment (not shown), the pouch 214 directly contacts the tab 212 (without the use of an adhesive layer) to seal the battery 200. The thickness $t_2$ of this portion of the tab 212 is constant across the section (when viewed along the longitudinal axis X-X'). The maintenance in thickness $t_2$ from the region 315 in the FIG. 4B to the region 317 in the FIG. 4C facilitates uniform and continuous contact (not shown) between the pouch 214 and the tab 212 and this uniform and continuous contact prevents leakage of electrolyte from the battery as well as prevents contamination of the electrolyte by external impurities such as moisture and undesirable salts.

FIG. 4D shows section 212C and depicts the portion of the tab 212 that lies outside the pouch 214. This portion of the tab 212 has thickness variations that facilitate processes such as bending of the tab and welding of the tab to integrated circuit boards (ICB). The FIG. 4D has one or more indentations 319 of thickness $t_3$ that is less than the thickness $t_2$ (thickness of the tab 212 where it contacts the pouch 214 (see FIG. 4C)). The indentations facilitate bending of the tab to facilitate efficient spatial contact with the load. By providing a plurality (two or more) of such indentations in the tab 212, the tab can be deformed such that it can occupy a fairly convoluted configuration. Bending the tab will allow for the battery to occupy a smaller space and therefore be fitted into constricted spaces in the body of a device that it is used to provide power to.

The indentation 319 may have any desired shape depending upon the amount of deformation required of the tab 212. For example, the indentation can be a "V" shaped indentation, a "U" shaped indentation, or a combination thereof. The opening of the indentation may be on the upper surface 213 of the tab 212 or on the lower surface 211 of the tab 212. The direction of the opening (e.g., facing up or down) and its width (w) are dependent upon the desired direction of tab bending.

The tab 212 may also contain an optional section 320 (also referred to herein as an attachment section) of thickness $t_4$ to facilitate welding the tab 212 to a load (not shown). In a preferred embodiment, the load is an integrated circuit board (ICB). The attachment portion 320 is located further from the point where the pouch 214 contacts the tab 212 than the indentation(s) 319. In an embodiment, the thickness $t_4$ of section 320 is greater than the thickness $t_3$ of the indented region 319. In another embodiment, the thickness $t_3$ of the indented region 319 is greater than the thickness $t_1$ of the region 313 (see FIG. 4B).

The tab 212 comprises a metal piece and is manufactured from a metal that can be welded to the electrode. Suitable metals for use in the tab are copper, nickel, cobalt, iron, or alloys thereof. These tabs are advantageous in that they facilitate greater heat dissipation and offer opportunities for producing batteries of reduced size.

The remainder of this document deals with other aspects of the battery 200 namely the pouch and the electrolyte contained in the pouch.

Figure 5:
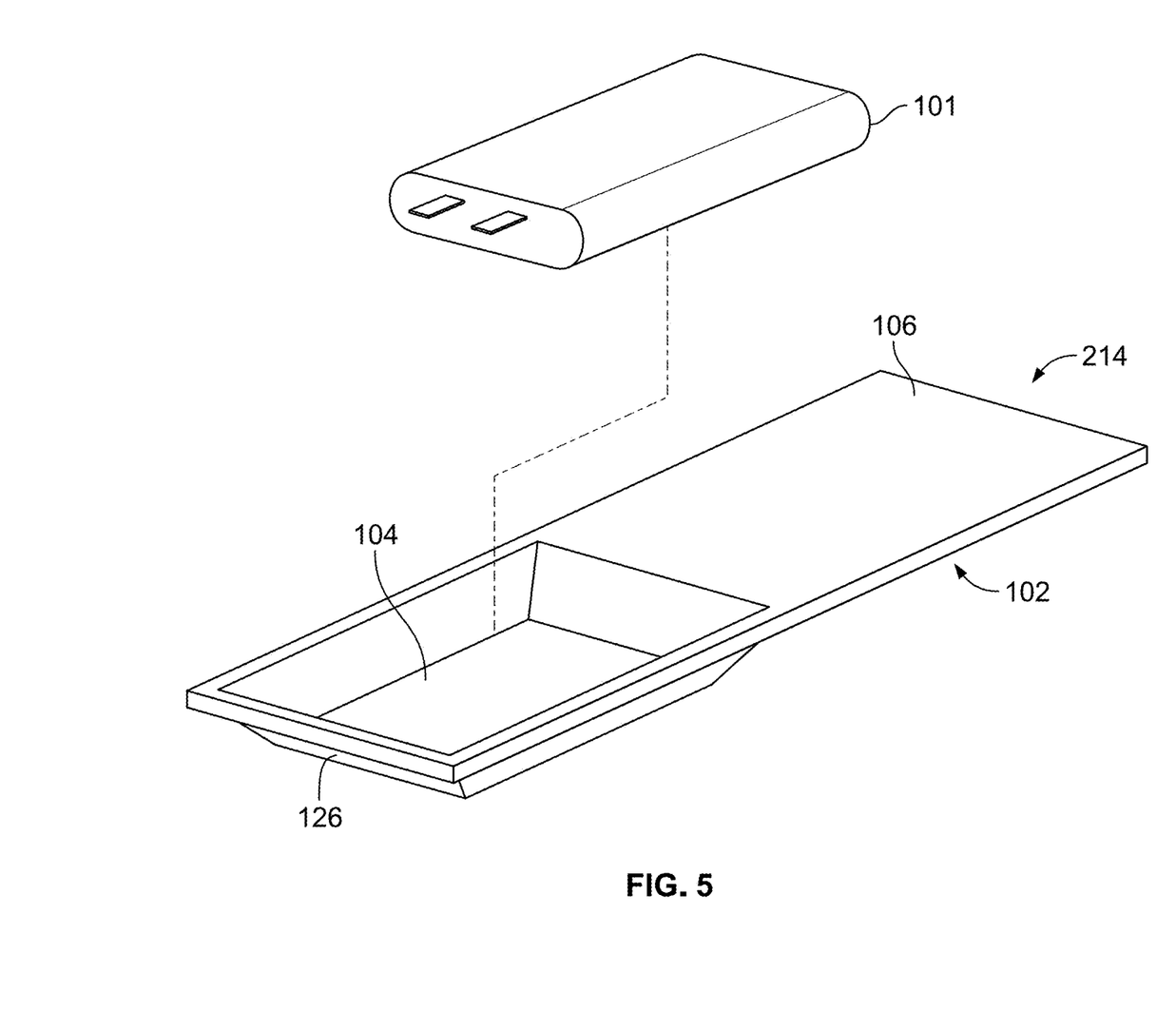
FIG. 5 is a depiction of one exemplary embodiment of the pouch.
Figure 6:
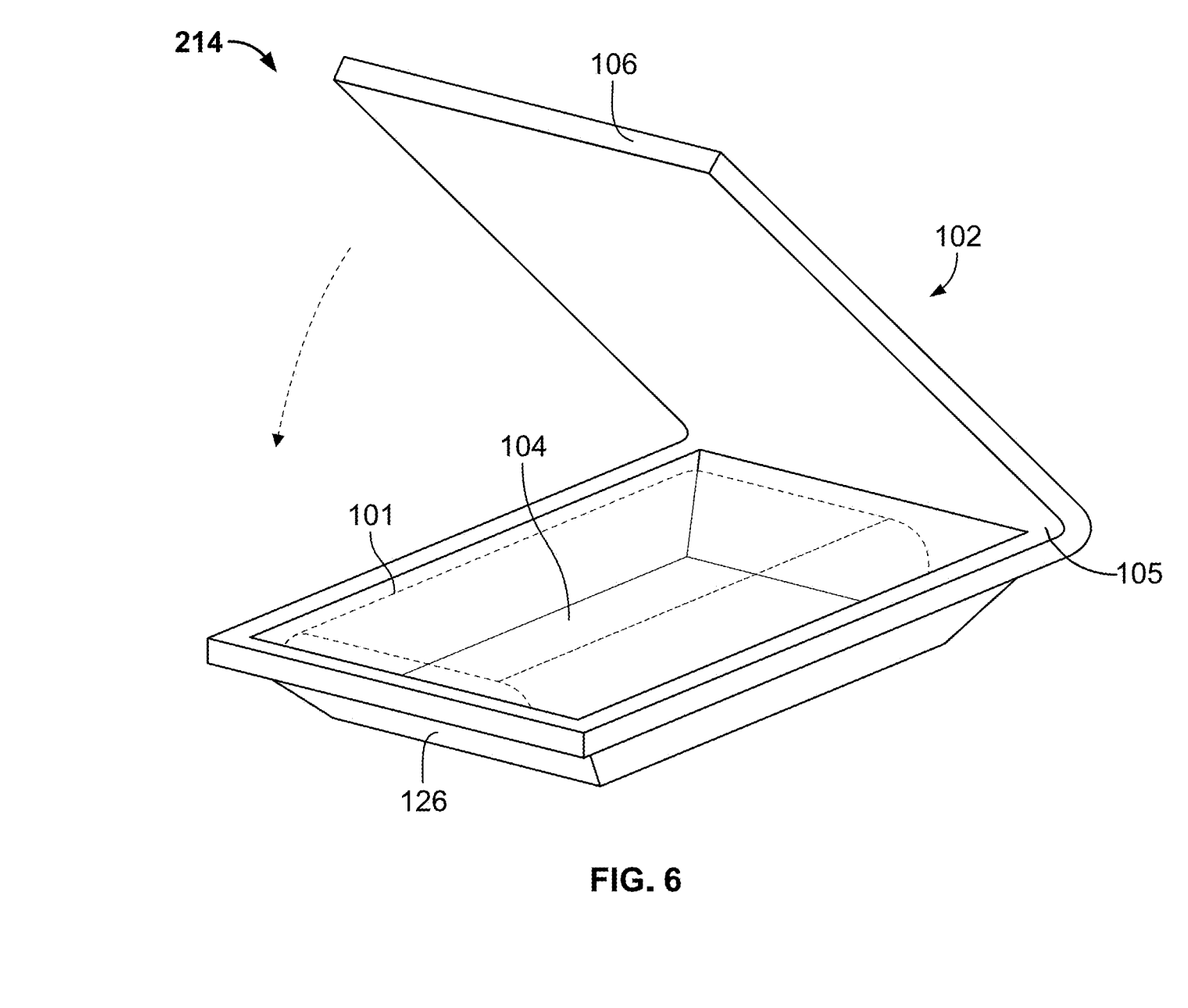
FIG. 6 is a depiction of another exemplary embodiment of the pouch.

FIGS. 5 and 6 illustrate an exemplary embodiment of a pouch 214 for the battery 200. The pouch 214 may be created from a multilayer laminate sheet 102. The pouch 214 may be constructed by forming a cavity 104 in one portion, such as, for example, the bottom section 126 of the multilayer laminate sheet 102.

A second portion of the pouch 214, such as, for example the top portion 106 may then be folded along a fold line 105 to cover the cavity 104. In an embodiment, the fold line is perpendicular to the opposing edges of the sheet 102 as shown in FIG. 6. It is to be noted that the bottom section 126 and the top portion 106 may be reversed. For example, the bottom section 126 (with the cavity) can be the top section, while the top portion 106 (the flat portion) can be the bottom portion. The cavity 104 has a predetermined shape, in terms of width and depth, for accommodating a given electrode assembly of a battery 101. For example, as shown in FIG. 5, the cavity 104 may be generally rectangular. In other embodiments, the shape may be square, circular, triangular, and so on. In addition, the cavity may have one or more protrusions or cavities that are used to receive or house other components, modules or structures of the electronic device.

In an embodiment, the pouch 214 may be manufactured from a multilayer laminate sheet that comprises an inner sealant layer (not shown) and an outer metal layer (not shown). The respective layers may be bonded together using, for example, dry lamination, heat lamination, or extrusion lamination to form the multilayer sheet. In other embodiments, the multilayer laminate sheet may comprise more than two layers. As one example, the outer layer may be a metal (not shown), a middle layer may be a puncture-resistant, nonconductive material such as a polymer or the like (not shown), and an inner layer may be a sealant layer (not shown). The sealant layer may have adhesive disposed over part or all of it, in certain embodiments. Further, the sealant layer may be a material that can be bonded or fused to itself, for example by heating, to create a seal.

The inner sealant layer may be in direct contact with an electrode assembly 101 of a battery (not shown). In an embodiment, the inner sealant layer is a polymer. The inner sealant layer may be composed of a polyolefin-based polymer such as, but not limited to, polypropylene, chlorinated polypropylene, polyethylene, ethylene-propylene copolymer, polyethylene-acrylic acid copolymer, and polypropylene-acrylic acid copolymer. In an embodiment, the inner sealant layer is a cast polypropylene film. The inner sealant layer provides insulation to the electrode assembly 101 of the battery as well as providing a barrier to external moisture, oxygen and contaminants. The outer layer may act as a barrier to external moisture, oxygen and other contaminants. In addition, the outer metal layer may help maintain the strength of the pouch 214. The outer metal layer may be constructed from various metals such as, but not limited to, aluminum, nickel, steel or other alloys, and the like.

The electrolyte is contained within the pouch 214 and is preferably a liquid electrolyte (but may be liquid, semi-solid, solid, or gaseous). Suitable liquid electrolytes include ether-based liquid electrolytes, polymer electrolytes, solvent-in-salt electrolytes, or a combination thereof.

Ether-based liquid electrolytes include lithium salts that are dissolved in cyclic and noncyclic ethers (also referred to as ether-based solvents). Lithium salts which can be dissolved in the ether to form the nonaqueous liquid electrolyte solution include $LiClO_4$, $LiAlCl_4$, LiI, LiBr, LiSCN, $LiB(C_5H_5)_4$, $LiAsF_6$, $LiCF_3SO_3$, $LiN(FSO_2)_2$, $LiN(CF_3SO_2)_2$, $LiAsF_6$, $LiPF_6$, or mixtures thereof. The ether-based solvents include cyclic ethers, such as, for example, 1,3-dioxolane (DOL), tetrahydrofuran, 2-methyltetrahydrofuran; and chain structure ethers, such as, for example, 1,2-dimethoxyethane (DME), 1,2-diethoxyethane, ethoxymethoxyethane, tetraethylene glycol dimethyl ether (TEGDME), polyethylene glycol dimethyl ether (PEGDME), or mixtures thereof.

Other solvents that may be used in the ether-based liquid electrolyte may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane (DOL), ethyl formate, ethylene carbonate (EC), ethylmethyl carbonate (EMC), lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene triethylene glycol, polyethylene glycols, carbonic acid ester, γ-butyrolactone, tricyanohexane, or a combination thereof.

In an exemplary embodiment, the electrolyte comprises 1M $LiPF_6$ in 1:1 (v/v) of EC:EMC or 0.6 M LiTFSI (lithium bis(trifluoromethanesulfonyl)imide) 0.4M $LiNO_3$ (lithium nitrate) in 1:1 (v/v) DME:DOL.

The liquid electrolyte may contain a liquid electrolyte component and a polymeric component (e.g., a polymer protection layer) that are called a "polymer electrolyte". Polymer electrolytes are capable of maintaining surface contact with the negative electrode as the surface of the negative electrode becomes rough due to a variety of factors such as, for example, the growth of dendrites, irregular deposition of lithium during charging, and so on. The liquid electrolyte component and the polymeric component may be distinct layers, or they may be blended. When the components are present as distinct layers, the liquid electrolyte may be disposed adjacent to the negative electrode and the polymeric component, which may include one or more layers, which may be disposed between the liquid electrolyte and the negative electrode. When the components are blended, the resultant electrolyte system may have a blended gel or composite structure.

The liquid electrolyte component can include liquid electrolytes detailed above and below. In the interest of brevity additional description of the electrolyte will not be pursued here. In an embodiment, the liquid electrolyte component contains the lithium salt. The lithium salts listed above can be included in these polymer electrolytes.

The polymer component may include solid state polymeric electrolytes such as polyethylene oxide (PLO), polymethylmethacrylate (PMMA), polyacrylonitrile (PAN), poly vinylidene fluoride (PVDF) and gel electrolytes (i.e., polymers plasticized with solvent) by way of non-limiting example.

Polymer electrolytes may also include intrinsically conducting polymers such as for example, polyaniline in both neutralized and unneutralized forms, poly pyrrole, polythiophene, polyacetylene, polycarbazoles, polyindole, polyazepines, poly(fluorene)s, polyphenylenes, polypyrenes, polyazulenes, polynaphthalenes, poly(p-phenylene vinylene), or a combination thereof. Polymer electrolytes may be used in the presence of solvents. Solvents used in electrolytes of this type are listed above.

In another embodiment, the polymer electrolyte can be complexed with a Li salt. In these polymer electrolytes there is no solvent to plasticize the polymer so the polymer may be considered dry. The polar groups in the polymer (e.g., —O—, —S—, and the like) are effective building blocks for dissolving lithium salts. For example, in polyethylene oxide, the lone pair of oxygens on the polyethylene oxide segment is coordinated to the lithium ion by Coulombic interaction, causing the anion and cation of the lithium salt to dissociate. In the process, the polyethylene oxide acts as solvent, and the lithium salt dissolves into the polyethylene oxide matrix. In addition to the oxygen atom (—O—) on the polyethylene oxide chain, other atoms such as the nitrogen in the imide (—NH—) and the sulfur in the thiol (—S—) also play a similar role. Under the electric field, the migration movement of Li+ cations are from one coordination point to another along the polymer segment or jump from one segment to another.

The solvent-in-salt electrolyte may include one or more salts bound to a solvent. The electrolyte may include one or more salts having a concentration greater than 1M (molar), preferably greater than 3M, and more preferably greater than 4M. The lithium salts and solvents listed above may also be used in the solvent-in-salt electrolyte.

In an embodiment, the electrolyte includes a combination of room temperature ionic liquids and lithium salts. The room temperature ionic liquids that are used to dissolve lithium salts.

Lithium salts listed above may be dissolved in the room temperature ionic salts. The room temperature ionic salts include organic cations and anions. Organic cations may include 1-(3-cyanopropyl)-3-methylimidazolium, 1,2-dimethyl-3-propylimidazolium, 1,3-bis(3-cyanopropyl)imidazolium, 1,3-diethoxyimidazolium, 1-butyl-1-methylpiperidinium, 1-butyl-2,3-dimethylimidazolium, 1-butyl-3-methylpyrolidinium, 1-butyl-4-methylpyridinium, 1-butylpyridinium, 1-decyl-3-methylimidazolium, 1-ethyl-3-methylimidazolium, 3-methyl-1-propylpyridinium, or a combination thereof.

The anion may include bis(trifluoromethanesulfonate) imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, or a combination thereof.

Solvents may also be used in these room temperature ionic liquid based electrolytes and these solvents are included in the list above.

In one exemplary embodiment, the one or more ionic salts may include lithium bis(fluorosulfonyl) imide (LiFSI) and the solvent may be dimethoxyethane. A molar ratio of the one or more salts to the dimethoxyethane may be greater than or equal to about 1 to less than or equal to about 1.5. The electrolyte system may be substantially free of unbound dimethoxyethane and unbound bis(fluorosulfonyl)imide (FSI). In another embodiment, the electrolyte may include 1M LiFSI in n-propyl-n-methylpyrrolidinium bis(fluorosulfonyl)imide.

In one embodiment, in one method of producing the battery, the pouch is first manufactured by methods including injection molding, stamping, embossing. The cavity of the pouch is manufactured to accommodate the battery and the tabs. The electrodes (or plurality of electrodes) are then welded together and to a separately prepared tab. The pouch is filled with an electrolyte and the pouch is sealed using an elevated temperature and optional pressure to seal the pouch onto the tabs so that the electrolyte does not leak from the pouch.

The tabs are first manufactured (prior to assembly in the pouch) in a separate process. In one embodiment, the tabs are initially manufactured via a sheet roll forming and/or a stamping process. For roll forming, sheets of metal can have the indentations roll formed on a base material and then cut to the desired shape. For stamping, sheets of metal are stamped (to produce the indentations) on a base material and then cut to shape.

In another embodiment, the tabs are initially manufactured by casting a molten metal into a mold or by sintering a metal powder. The initially prepared tabs are preferably manufactured to be as close as possible to the final shape that they will occupy. This is done to avoid increased manufacturing costs. The cast or sintered tabs are then subjected to one or more finishing processes (polishing, lapping, deburring, or the like). The finished tabs are then welded to the electrodes and placed in the pouch or in a suitable container and then disposed in the pouch.

In another embodiment, the tabs (with or without the electrodes) are manufactured via additive manufacturing. Here the desired material (in molten form) is passed through a nozzle according to a computer programmed profile to produce the tab. The tabs are then welded to the electrodes and placed in the pouch or in a suitable container and then disposed in the pouch.

The tabs disclosed herein are advantageous in that they facilitate greater heat dissipation (while keeping temperatures in the battery lower) and offer opportunities for conforming to traditional pouch manufacturing processes. The design (having different sections of different thicknesses) permit the sealing of the pouch thereby avoiding electrolyte leakage and electrolyte contamination. It also permits the welding of the tabs to one or more electrodes without increasing pouch thickness. The presence of indentations permit bending of the tab thus facilitating the pouch use in constricted regions of a device.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery comprising a tab and a pouch wherein the tab comprises:
    a metal piece having:
      a cross-sectional area geometry that when viewed in a lateral direction is tapered at the ends; and
      a cross-sectional area geometry having a variable thickness when viewed in a longitudinal direction; where the longitudinal direction is perpendicular to the lateral direction; and wherein when viewed in the longitudinal direction, a tab thickness $t_1$ at a location where the tab is in contact with an electrode is less than a tab thickness $t_2$ at a location where the tab contacts the pouch
    wherein the metal piece further contains an indentation outside the pouch such that a tab thickness $t_3$ at the indentation is less than the thickness $t_2$.

2. The battery of claim 1, where the cross-sectional geometry is a trapezoid when viewed in the lateral direction.

3. The battery of claim 1, wherein an outer surface of the metal piece is parallel to an inner surface of the pouch when viewed in the lateral direction.

4. The battery of claim 1, wherein an outer surface of the metal piece contacts an inner surface of the pouch when viewed in the lateral direction and prevents a leakage of electrolyte from the battery.

5. The battery of claim 3, wherein the outer surface of the metal piece continuously contacts the inner surface of the pouch when viewed in the lateral direction.

6. The battery of claim 1, wherein the thickness $t_1$ permits the metal piece to overlap with the electrode inside the pouch when viewed in the longitudinal direction; and wherein the electrode contacts the metal piece via a weld.

7. The battery of claim 1, wherein the indentation facilitates bending of the metal piece.

8. The battery of claim 1, wherein the metal piece further contains an attachment portion of thickness $t_4$ that is greater than the thickness $t_3$ when viewed in the longitudinal direction; and wherein the thicker section facilitates welding of the tab to a load.

9. The battery of claim 8, wherein the attachment portion $t_4$ is located further from the pouch than the indentation of thickness $t_3$.

10. The battery of claim 5, wherein the pouch comprises an inner sealant layer that is in continuous contact with the tab.

11. The battery of claim 1, where the battery comprises a liquid electrolyte.

12. A method comprising:
    roll forming and/or stamping a sheet of metal;
    casting a molten metal into a die; or
    sintering a metal powder under pressure;
    forming a tab for a battery; wherein the tab comprises:
      a cross-sectional area geometry that when viewed in a lateral direction is tapered at the ends; and
      a cross-sectional area geometry having a variable thickness when viewed in a longitudinal direction; where the longitudinal direction is perpendicular to the lateral direction; and wherein when viewed in the longitudinal direction a tab thickness $t_1$ at a point where the tab is in contact with an electrode is less than a tab thickness $t_2$ at a point where the tab contacts a pouch of the battery.

13. The method of claim 12, further comprising performing a finishing operation on the tab; wherein the finishing operation comprises machining and polishing the tab.

14. The method of claim 12, further comprising sealing an inner surface of the pouch to an outer surface of the tab.

15. The method of claim 12, further comprising welding the tab to a plurality of electrodes located in the pouch.

16. A battery comprising a tab wherein the tab comprises:
a metal piece having:
a cross-sectional area geometry having a variable thickness when viewed in a longitudinal direction; where the longitudinal direction is perpendicular to a lateral direction; and wherein when viewed in the longitudinal direction, a tab thickness $t_1$ at a location where the tab is in contact with an electrode is less than a tab thickness $t_2$ at a location where the tab contacts a pouch,
wherein the metal piece further includes an indentation of thickness $t_3$ that lies outside the pouch when viewed in the longitudinal direction; and wherein the thickness $t_3$ is less than the thickness $t_2$.

* * * * *